US009467223B2

(12) United States Patent
McKinney et al.

(10) Patent No.: US 9,467,223 B2
(45) Date of Patent: Oct. 11, 2016

(54) SYSTEM AND METHOD FOR BROADBAND SIGNAL DISAMBIGUATION BASED ON SUB-SAMPLED ANALOG OPTICAL LINKS EMPLOYING SAMPLE RATE MODULATION

(71) Applicants: Jason D. McKinney, Bowie, MD (US); Sharon R. Harmon, Herndon, VA (US)

(72) Inventors: Jason D. McKinney, Bowie, MD (US); Sharon R. Harmon, Herndon, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/861,757

(22) Filed: Sep. 22, 2015

(65) Prior Publication Data
US 2016/0087716 A1    Mar. 24, 2016

Related U.S. Application Data

(60) Provisional application No. 62/054,131, filed on Sep. 23, 2014.

(51) Int. Cl.
*H04B 10/08* (2006.01)
*H04B 10/079* (2013.01)
*H04B 10/11* (2013.01)

(52) U.S. Cl.
CPC ............. *H04B 10/079* (2013.01); *H04B 10/11* (2013.01)

(58) Field of Classification Search
CPC .. H04B 10/079; H04B 21/02; H04B 10/505; H04B 10/11; H04B 10/5051; H04B 10/508; H04B 10/541; H04B 10/548; H04B 10/66; H04B 10/54; H04B 10/60; H04L 1/205
USPC .................. 398/25, 185, 186, 188–191, 202
See application file for complete search history.

(56) References Cited

U.S. PATENT DOCUMENTS

| | | | | |
|---|---|---|---|---|
| 4,333,353 A * | 6/1982 | Baumoel | ................. | G01P 5/242 73/861.25 |
| 6,178,036 B1 * | 1/2001 | Yao | .................... | H04B 10/2916 250/227.11 |
| 7,035,325 B2 * | 4/2006 | Kleck | .................... | H04L 1/205 375/226 |
| 8,059,969 B1 * | 11/2011 | Yap | .................. | H04B 10/25759 398/140 |
| 8,103,178 B2 * | 1/2012 | McKinney | .......... | H04B 10/2507 398/202 |
| 8,554,085 B1 * | 10/2013 | Yap | ........................... | G02F 2/02 398/183 |
| 9,071,363 B2 * | 6/2015 | Wen | .................... | H04B 10/5165 |
| 9,172,471 B2 * | 10/2015 | Hutchinson | .......... | H04B 10/532 |
| 2001/0021059 A1 * | 9/2001 | Yariv | .................... | H04B 10/505 359/264 |
| 2006/0018006 A1 * | 1/2006 | Watanabe | ................ | G01J 11/00 359/332 |
| 2014/0270807 A1 * | 9/2014 | Hutchinson | .......... | H04B 10/532 398/184 |

* cited by examiner

*Primary Examiner* — Hibret Woldekidan
(74) *Attorney, Agent, or Firm* — US Naval Research Laboratory; Suresh Koshy

(57) ABSTRACT

A system for measuring an RF input signal frequency includes a sampling optical pulse train with a frequency-dithered repetition-rate, and a sub-sampled analog link coupled to the optical pulse train whereby the RF input signal frequency is determined. This frequency dither imparts well-characterized modulation sidebands onto the input RF signal to be measured. By measuring the amplitude of these sidebands relative to the incoming aliased signal amplitude the frequency of the original signal is readily determined. The use of optical sampling dramatically increases the bandwidth over which the disambiguation technique is applied, and coarse disambiguation is achieved in a single acquisition.

5 Claims, 4 Drawing Sheets

SYSTEM AND METHOD FOR BROADBAND SIGNAL DISAMBIGUATION BASED ON SUB-SAMPLED ANALOG OPTICAL LINKS EMPLOYING SAMPLE RATE MODULATION

CROSS-REFERENCE TO RELATED APPLICATIONS

This application claims the benefit of U.S. Provisional Application 62/054,131 filed on Sep. 23, 2014, and incorporated herein by reference.

FIELD OF THE INVENTION

The invention is directed to a sub-sampled analog link, and more particularly to one which uses a sampling optical pulse train with a frequency-dithered repetition rate to determine an RF signal frequency.

BACKGROUND OF THE INVENTION

With increasing radio-frequency (RF) spectral occupancy it is becoming increasingly important for electronic support measures (ESM) systems to monitor the radio-frequency spectrum from well below 1 GHz to nearly 100 GHz in real time. Photonic architectures for signal down-conversion (subsampling) and disambiguation are enabling technologies for real-time wideband signal monitoring which could provide lower size-weight-power-cost (SWaP-C) and reduced latency in next-generation military ESM and civilian applications.

From sampling theory it is well known that, when the bandwidth of an incoming signal exceeds one-half of the digitizer sampling rate, aliasing of the signal will occur. In all-electronic systems, specifically folding analog-to-digital converters (ADCs), the frequency ambiguity resulting from this aliasing process may be resolved in several ways. Most simply, an anti-aliasing filter may be placed before the ADC thereby limiting the input bandwidth to a known range. This directly removes any frequency ambiguity. Alternatively, two ADCs operating at two distinct sampling rates may be utilized. By using a lookup table, the unique mapping of the aliased signals from the two ADCs may be determined to reconstruct the original input signal (see U.S. Pat. No. 6,031,869, incorporated herein by reference). A final technique is to sample the input waveform using two ADCs where an intentional known delay is introduced prior to one of the ADCs. By measuring the additional phase change introduced by this additional delay the linear relation between phase and frequency may be inverted to determine the original input frequency (see U.S. Pat. No. 5,109,188, incorporated herein by reference). In optically subsampled (downconverting) ADC architectures, the first technique of applying a known bandwidth anti-aliasing filter is the only method which is equivalent to testing the optical ADC with a known input signal in the absence of a filter.

There are several limitations of these techniques. First, all are limited in the RF bandwidth to which they may be applied—the analog bandwidth of virtually all electronic ADCs is limited to approximately twice the sample rate. Thus, to monitor a frequency bandwidth approaching 100 GHz would require either multiple parallel downconvert-and-digitize channels or frequency-swept architectures. The use of appropriate anti-aliasing filters would necessarily need to be applied in either of these architectures. The latter two techniques require the use of two ADCs per-channel which increases the complexity and cost substantially when addressing such a broad bandwdith. While the use of a known delay is conceptually quite simple, from a system perspective delay variations in the RF chain or thermal fluctuations can limit the accuracy of the technique.

BRIEF SUMMARY OF THE INVENTION

According to the invention, a system for measuring an RF input signal frequency includes a sampling optical pulse train with a frequency-dithered repetition-rate, and a sub-sampled analog link coupled to the optical pulse train whereby the RF input signal frequency is determined.

Our invention is a sampled analog link which uses a sampling optical pulse train with a frequency-dithered repetition-rate. This frequency dither imparts well-characterized modulation sidebands onto the input RF signal to be measured. By measuring the amplitude of these sidebands relative to the incoming aliased signal amplitude the frequency of the original signal is readily determined.

There are two primary advantages to our technique. First, the use of optical sampling dramatically increases the bandwidth over which our disambiguation technique may be applied—while the technique itself may also be applied to all-electronic ADC architectures, the RF bandwidth of these devices is typically only twice the sample rate. Here, we may approach an RF bandwidth of 100 GHz or more as determined by the optical modulator. The second advantage is that coarse disambiguation is achieved in a single acquisition. Other techniques, for example using multiple sample frequencies, require at least two acquisitions (either serial or parallel in time) which may be intractable in some applications.

DETAILED DESCRIPTION OF THE INVENTION

Figure 1:
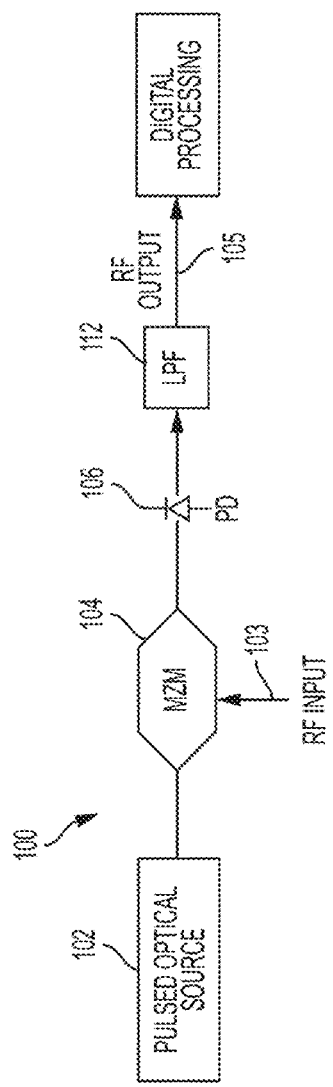
FIG. 1 is a pulsed optical source according to the invention.

The basic architecture for a sampled analog optical link 100 is shown in FIG. 1. The pulse train from a pulsed optical source 102 optically samples the incoming RF signal 103 via a Mach-Zehnder intensity modulator 104. The output RF signal 105 is recovered by direct detection of the modulated optical pulse train with a photodiode 106. From sampling theory it is well-known that, when the frequency of the RF input ($\omega_{in}/2\pi$) exceeds one-half of the optical sampling rate ($\omega_{rep}/2\pi$), the RF output will be aliased to a frequency of $\omega = \omega_{rep} - (\omega_{in} \bmod \omega_{rep})$ which may also be written as $\tilde{\omega}=n\omega_{rep}-\omega_{in}$ where n represents the index of the alias band where the original signal resides. Clearly, when no steps are taken to prevent aliasing there may be substantial ambiguity in the detected RF output of the link. In many applications, the input frequency range is limited by placing an appropriate anti-aliasing filter at the link input, thereby restricting the input frequency range and removing any ambiguity. For wideband ESM applications spanning many alias bands, such filtering operations may not be applied. This clearly motivates alternative techniques for signal disambiguation. The theory of operation for our disambiguation technique is described below.

Figure 2:
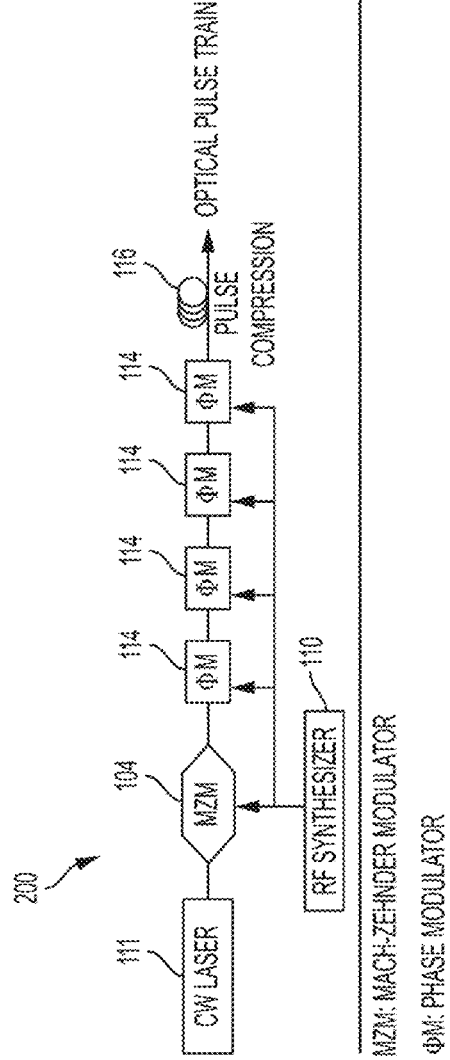
FIG. 2 is an optical comb generator according to the invention.

It is well known that the phase power spectral density arising from fluctuations in the repetition rate (the temporal jitter) of a pulse train grows proportionally to $n^2$ in the RF power spectrum. Here $n=f_n/f_{rep}$ is an integer number representing the ratio of the n-th harmonic of the pulse train repetition rate divided by the fundamental repetition rate. When this pulsetrain is used to sample an incoming RF signal, the phase noise from the pulse train is transferred to the input RF signal. In a subsampling link architecture, i.e. where the input RF signal is not required to reside in the fundamental Nyquist band ($0 \le f \le f_{rep}/2$) but the output measurement bandwidth is limited to the fundamental Nyquist band, the phase noise sidebands may be used to coarsely discern the signal's original center frequency. In this work we apply a well-defined jitter, or fluctuation in the repetition rate of the sampling optical pulse train, through FM modulation of the signal used to generate the sampling pulse train in an optical comb generator 200 (FIG. 2). Other sources include a tunable-rate actively-modelocked laser, a modelocked laser with a known timing jitter, and other art-recognized means.

To show how the introduction of a known frequency dither (equivalently a known timing jitter) may be used to achieve wideband signal disambiguation, we begin by analyzing the time domain expression for the photocurrent at the output of a sampled analog optical link. The photocurrent derived from one output of the Mach-Zehnder intensity modulator (MZM) may be written as $$i(t)=p(t)[1+v_{in}(t)*h_{mzm}(t)]*h_{pd}(t)*h_{1pf}(t) \quad (1)$$

where p(t) is the temporal power profile of the sampling pulse train, $v_{in}(t)$ is the input RF voltage applied to the MZM (not limited to pure sinusoids, to be discussed below), $h_{mzm}(t)$ is the impulse response of the MZM, $h_{pd}(t)$ is the impulse response of the photodiode 106, $h_{1pf}(t)$ is the impulse response of the low-pass filter 112 used to restrict the link output to the fundamental Nyquist band, and * denotes convolution. For input signals in the small-signal regime the double-sided RF power spectrum may be written as (for a quadrature-biased link)

$$P_{rf}(\omega) = \frac{1}{2}I_{avg}^2|P_{sp}(\omega)|^2|H_{pd}(\omega)|^2|H_{lp}(\omega)|^2 R_o + \frac{1}{2}\pi^2 I_{avg}^2 \left| P_{sp}(\omega) * \frac{V_{in}(\omega)}{V_\pi(\omega)} \right|^2 |H_{pd}(\omega)|^2|H_{lp}(\omega)|^2 R_o. \quad (2)$$

Here, $p_{sp}(\omega)$ is the spectrum of the pulse intensity, $H_{pd}(\omega)$ is the frequency response of the photodiode 106 normalized to its DC responsivity, $V_\pi(\omega)$ is the frequency-dependent half-wave voltage of the MZM, and $R_o$ is the load resistance seen by the photodiode 106. The average photocurrent at quadrature ($I_{avg}$) is given by the product of the average optical power ($P_o$) and the DC responsivity of the photodiode 106.

When the sampling optical pulse train consists of a series of identical pulses the time-domain intensity profile may be written as $$p(t) = \tilde{p}(t) * \sum_{n=-\infty}^{\infty} \delta(t-nT), \quad (3)$$

where $\tilde{p}(t)$ is the intensity profile of a single pulse in the train, $\delta( )$ is the Dirac delta function, and T is the repetition period of the pulse train—here, the pulse train is assumed to be perfectly periodic. The spectrum of the pulse intensity (normalized to the average optical power, $P_o$) is then given by the Fourier transform of Eq. (3)

$$P_{sp}(\omega) = \frac{\tilde{P}(\omega)}{P_o} \times \sum_{n=-\infty}^{\infty} \delta(\omega - n\omega_{rep}) \quad (4)$$

Here, we see the spectrum of the pulse intensity consists of an optical comb with a line spacing given by $\omega_{rep}=2\pi/T$ weighted by the Fourier transform of the intensity of a single pulse in the train. It should be noted that for wideband operation it is desirable to have very short sampling pulses. In our system, the use of cascaded intensity and phase modulation results in a broad optical comb, however, the time-domain intensity immediately after the phase modulator corresponds to an approximately 50% duty cycle square wave at the comb repetition rate. To exploit the comb bandwidth and achieve short sampling pulses requires phase-compensation of the optical comb as it is readily shown that—for a fixed optical bandwidth—the pulse duration is minimized when the spectral phase is uniform. Given the dominant spectral phase variation in our apparatus is quadratic, the pulses are readily compressed using standard single-mode optical fiber. If the sampling pulse train is again assumed to consist of a series of identical pulses, however, the repetition time is allowed to vary from pulse-to-pulse the time-domain intensity of the pulse train may be written as $$p(t) = \tilde{p}(t) * \sum_{n=-\infty}^{\infty} \delta(t-nT+\Delta T), \quad (5)$$

where $\Delta T$ represents a small deviation from the fundamental period of the pulse train. Provided the timing deviation is much smaller than the pulse period a first-order Taylor expansion of Eq. (5) readily yields $$p(t) = \tilde{p}(t) * \sum_{n=-\infty}^{\infty} \delta(t-nT) + \delta'(t-nT)\Delta T \quad (6)$$

$$= \sum_{n=-\infty}^{\infty} \tilde{p}(t-nT) + \frac{d}{dt}\tilde{p}(t-nT)\Delta T.$$

We define the timing deviation to be $$\Delta T=TJ(t) \quad (7)$$

where J(t) is a function of time representing the timing deviation relative to the fundamental period T. Note, in this work J(t) is deterministic—therefore, we may perform our analysis in terms of J(t) and its complex spectrum $S_J(\omega)$ directly. The complex spectrum of the pulse train intensity is found by taking the Fourier transform of Eq. (7) and is given by $$P_{opt}(\omega) = \qquad (8)$$

$$\frac{\tilde{P}(\omega)}{P_o} \sum_{n=-\infty}^{\infty} \delta(\omega - n\omega_{rep}) + \frac{\tilde{P}(\omega)}{P_o} \sum_{n=-\infty}^{\infty} jn\omega_{rep}T\delta(\omega - n\omega_{rep}) * S_J(\omega).$$

Here, we see that there are two components to the complex spectrum of the intensity of the sampling pulse train. The first consists of a periodic comb of frequencies spaced by the pulse repetition rate ($\omega_{rep}/2\pi=1/T$) and weighted by the Fourier transform of a single intensity pulse in the train. The second component consists of modulation sidebands resulting from the timing deviation of the pulse train which are also weighted by the Fourier transform of a single pulse in the train. These modulation sidebands grow linearly (in complex amplitude) with the index n of the periodic comb as predicted for phase-noise spectral growth in pulse trains exhibiting timing jitter.

To illustrate how the timing deviation of the sampling pulse train may be used to disambiguate signals when the link operates in a subsampling (downconverting) mode we insert the complex spectrum of the pulse train $P_{opt}(\omega)$ [Eq. (8)] into the expression for the RF power spectrum given by Eq. (2). We now consider the RF output power from the link in two cases. First, we consider the case when only the sampling pulse train is incident on the photodiode [$V_{in}(\omega)=0$] and the low-pass filter is removed. In this case the RF power spectrum consists of a comb of RF tones separated by the fundamental pulse repetition rate and the corresponding modulation sidebands arising from the pulse train timing deviation [essentially the magnitude-squared of Eq. (8)]. If we compare the ratio of powers of one of the modulation sidebands of the n-th order combline to the n-th-order combline—defined to be the sidelobe-to-peak ratio (SPR)—we find this ratio to be $$SPR_{comb}=[n\omega_{rep}T|S_J(\omega)|]^2 \qquad (9)$$

As expected, this ratio grows quadratically with the combline index n.

If we now consider the case where the RF input signal is present [$V_n(\omega) \neq 0$] and a low-pass filter is used to limit the output bandwidth to the fundamental Nyquist band ($0 \leq \omega \leq \omega_{rep}/2$) it is clear that signals present at the link input will be aliased at the link output. Input signals within the n-th order alias band will appear at alias frequencies given by $\tilde{\omega}=n\omega_{rep}-\omega_{in}$. Here, we define the alias band to be a frequency range with a bandwidth equal to the fundamental pulse repetition rate centered about the n-th-order RF combline. The peak power comparison of the central component and either sideband results in the same SPR given in Eq. (9) for an input signal $v_{in}(\omega)$ with bandwidth BW, provided the FM frequency ($\omega_j/2\pi$) is chosen such that the spectral components of Eq. (2) centered at $n\omega_{rep}-\omega_{in}$ and $n\omega_{rep}-\omega_{in}\pm\omega_j$ are clearly resolvable. From Eq. (2), if we compare the peak power of the input signal measured within the fundamental Nyquist band (i.e., the aliased signal sampled with a perfectly periodic optical pulse train) to the peak power of one of the modulation sidebands which appears about the input signal peak as a result of the timing deviation of the pulse train, we find it is also given by Eq. (9)

$$SPR_{sig}=SPR_{comb}=[n\omega_{rep}T|S_J(\omega)|]^2 \qquad (10)$$

For a sinusoidal frequency modulation applied to the signal generating the optical comb, the timing deviation may be written as $$J(t) = \frac{\kappa V_j}{\omega_j}\sin(\omega_j t) \qquad (11)$$

where $\kappa$ is the FM sensitivity (kHz/V) of the synthesizer 110 driving the comb source, $V_j$ is the amplitude of the FM control voltage, and $\omega_j/2\pi=f_j$ is the FM frequency. This yields a sidelobe-to-peak ratio given by $$SPR_{sig} = SPR_{comb} = SPR = \left(\frac{n}{2}\frac{\kappa V_j}{f_j}\right)^2. \qquad (12)$$

Therefore, we may directly determine the alias band from which the signal originated by measuring the SPR and comparing with that computed from Eq. (12). We note, a second ambiguity remains in the measured signal, that is, from which half of the alias band did the signal arise ($\omega_{in}<n\omega_{rep}$ or $\omega_{in}>n\omega_{rep}$). For many applications, such as utilizing the subsampled analog link 100 as a cueing receiver for a high-fidelity tuned superheterodyne receiver, this ambiguity is of no consequence. In cases where the spectral components are not clearly resolved, a second sampled reference signal (without FM, or with quadrature FM) would be required. For applications where further accuracy is required, a second sampling frequency may be used.

The RF gain of the subsampling link for signals in the n-th alias band may be written as (assuming there is no matching network internal to the photodiode)

$$G_n(\omega_{in}) = \left[\pi \frac{I_{avg}}{V_\pi(\omega_{in})}\right]^2 |P_{sp}(n\omega_{rep})|^2 \qquad (13)$$

$$|H_{pd}(n\omega_{rep}-\omega_{in})|^2|H_{lp}(n\omega_{rep}-\omega_{in})|^2 R_i R_o.$$

Here, $\omega_{in}$ is the original input signal frequency, the alias frequency is given by $n\omega_{rep}-\omega_{in}$, and $R_i$ is the input resistance of the MZM. The RF gain is seen to take a form similar to that of a conventional IMDD analog link, with additional frequency-filtering terms arising from the sampling optical pulse (intensity) shape and the low-pass filter. As noted earlier, the RF gain uniformity between alias bands improves as the sampling pulse duration decreases. For decreasing pulsewidth $|P_{sp}(n\omega_{rep})|^2$ varies less from band-to-band. From the Wiener-Khintchine theorem, $|P_{sp}(n\omega_{rep})|^2$ is readily determined from the intensity autocorrelation of the optical sampling pulse. It is important to note that the photodiode bandwidth need only cover the fundamental Nyquist band since the aliasing (downconversion) operation is the result of an optical heterodyne process. The optical modulator, however, must show high-efficiency across the RF frequency range of interest.

Reduction to Practice

Here we illustrate our technique through disambiguation of sinusoidal signals at center frequencies ranging from 1 MHz-40 GHz. A convenient method for generating tunable repetition-rate optical pulse trains is through cascaded eletrooptic amplitude and phase modulation schemes that produce wide-bandwidth optical frequency combs. FIG. 2 depicts the setup used in this research for optical comb and short pulse generation. We cascade a Mach-Zehnder intensity modulator (MZM) 104 with four phase modulators 114 which are driven with large ampltidue RF signals (relative to the modulator halfwave voltage). The large phase modulation index enables us to obtain broad optical combs from our CW laser 111. For this work we choose an input modulation frequency of $RF_{in}$=5 GHz, which translates into the repetition rate of the generated pulse signal and gives a Nyquist band edge of 2.5 GHz. All modulation was true time-delay matched which allows the repetition-rate to be continuously tuned over a multi-GHz range. Each phase modulator 114 is driven with 30 dBm (1 W), and the MZM intensity modulator 104 is quadrature-biased and driven at roughly one-half its 5 GHz half-wave voltage ($V_\pi \approx 6$ V). The output pulses from the comb generator 200 are then compressed with the proper amount of standard single-mode fiber 116, which was determined assuming a purely quadratic phase to be 1.57 km for this experiment. In this demonstration the root-mean-square duration of the intensity of the sampling pulses is approximately 6 ps. Note, any of a number of pulsed optical sources may be employed in the sampled link architecture including actively-modelocked lasers or low-biased Mach-Zehnder modulators driven by a step-recovery diode. The key requirement is that the repetition-rate must be dynamically tunable at least over a small range.

Figure 3B:
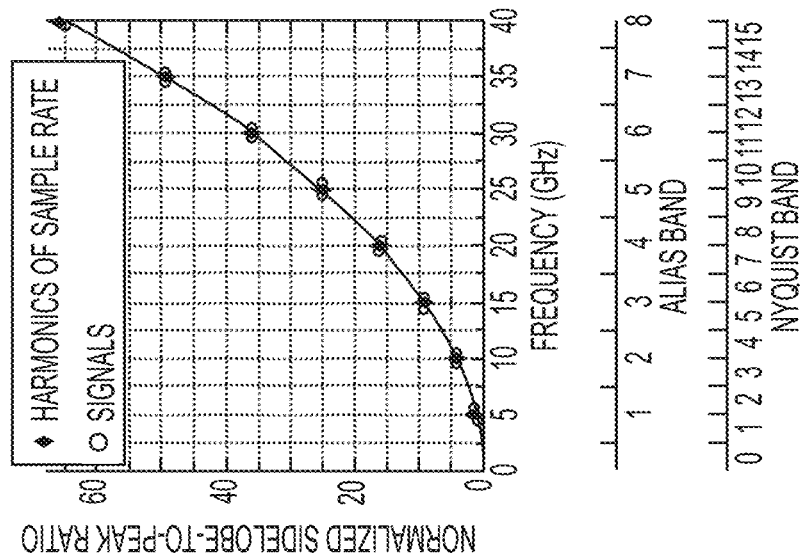
FIGS. 3A-B are graphs showing the change in SPR as a function of frequency (FIG. 3A) and the measured SPR growth as a function of frequency (FIG. 3B) according to the invention.
Figure 3A:
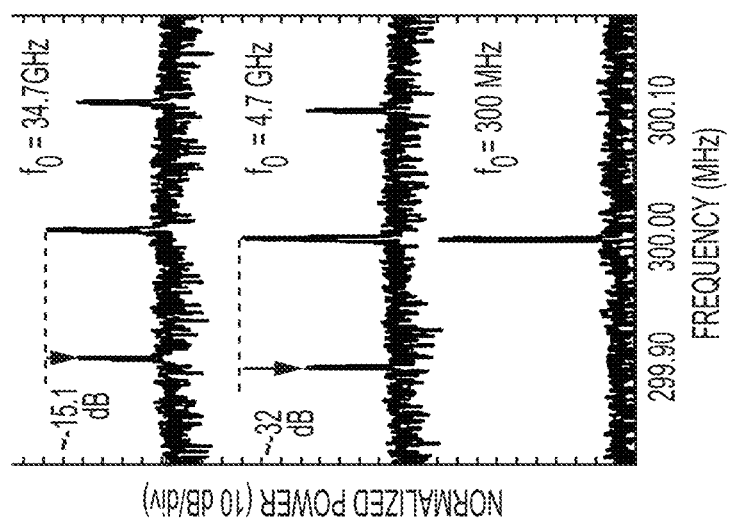

From Eq. (12), is it evident that the SPR grows as the square of the folding band→$n^2$. Therefore, once the SPR for the n=1 band is known, the alias band may be determined from the SPR assuming this quadratic growth. In our experiment $\kappa$=100 kHz/V, $V_j$=50 mV, $f_j$=100 kHz which yields [Eq. (12)] $SPR_{n=1}$=6.25×10$^{-4}$, or approximately −32 dB. In FIG. 3 (a) we illustrate the predicted increase in SPR by comparing the SPR for input signals at 300 MHz (n=0 alias band), 4.7 GHz (n=1 alias band), and 34.7 GHz (n=7 alias band). Note, the measurement is taken in the fundamental Nyquist band (0≤f≤2.5 GHz) where all of the above signals alias to a center frequency of 300 MHz. Signals that inherently fall within the fundamental Nyquist band do not exhibit the 100 kHz modulation sidebands, and have SPR=0 as illustrated when the input signal is 300 MHz (bottom curve). When the input signal frequency is such that aliasing occurs, the phase-modulation sidebands grow as illustrated for input signals at $f_{in}$=4.7 GHz (middle curve) and $f_{in}$=34.7 GHz (top curve). Here, the measured SPR values for 4.7 GHz and 34.7 GHz are, respectively, $SPR_{n=1} \approx -32$ dB and $SPR_{n=7} \approx -15.1$ dB in nearly perfect agreement with Eq. (12). This measurement is repeated for input signals with center frequencies up to 40 GHz and the results are shown in FIG. 3 (b). Here, the measured SPR for each input signal (circles), as well as each harmonic of the pulse train repetition rate (triangles) are normalized to the value corresponding to n=1 calculated from Eq. (12). For reference, the scale below the plot shows the definition of the alias bands and the corresponding Nyquist bands. It is very apparent from FIG. 3 (b) that the SPR growth is proportional to $n^2$ as expected illustrating that this quantity may be readily used to determine the alias band from which a given signal originated. A plot of $n^2$ is overlayed showing agreement with a quadratic growth profile.

Figure 4A:
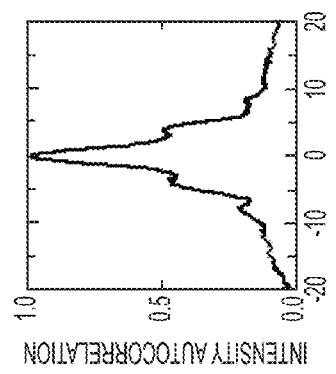
FIGS. 4A-B are graphs showing the optical spectrum from the comb generator (FIG. 4A) and the autocorrelation measurement of the compressed optical pulse (FIG. 4B) according to the invention.
Figure 4B:
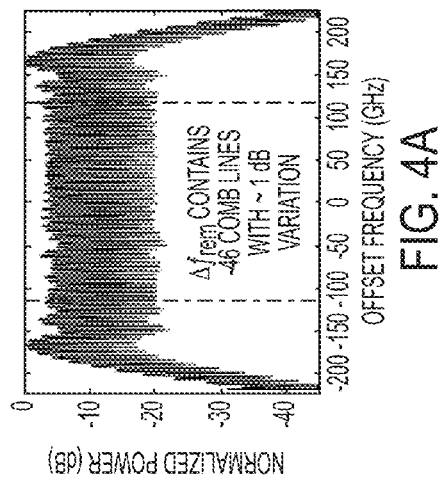

FIG. 4(a) shows the optical spectrum from the comb generator 200. The full root-mean-square (rms) bandwidth of the comb envelope is calculated to be $\Delta f_{rms}$~225 GHz from which the number of comb lines is determined from N=1+$\Delta f_{rms}/f_{rep}$, where frep is 5 GHz. Within the RMS bandwidth the comb exhibits ≈46 comblines which show about a 1 dB power variation (at full-width-at-half-maximum bandwidth, ΔfFWHM, ~93 features are obtained). FIG. 4(b) shows the autocorrelation measurement of the compressed optical pulse from which the RMS duration of the intensity pulse is determined to be approximately 6 ps. Ideal pulse compression is not achieved because of the deviation from a purely quadratic phase in our apparatus as evidenced by the bat ears in our optical spectra as well as the sidelobes visible in the intensity autocorrelation trace. A more uniform comb and moderately shorter pulse durations could be tailoring the drive waveform to obtain a more pure quadratic phase.

Figure 5:
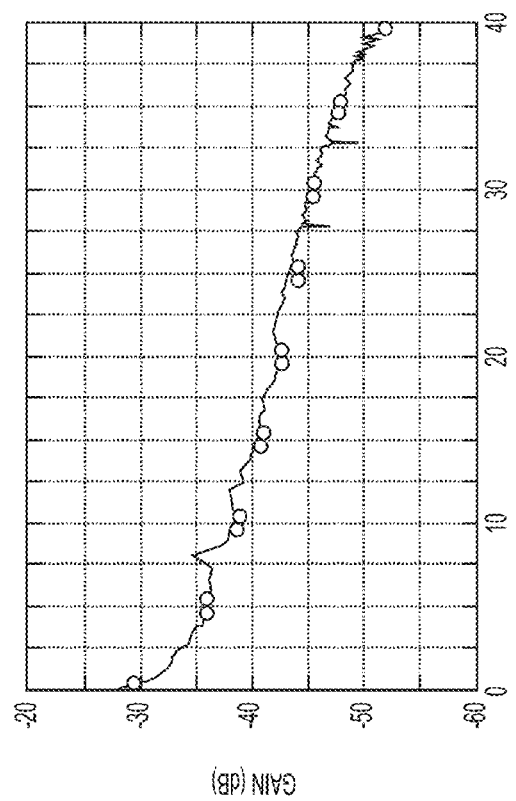
FIG. 5 is a graph showing the measured subsampled analog link gain versus frequency according to the invention.

For validation of the new gain expression presented in section 2, we start here with the RF gain performance of the subsampled analog link shown in FIG. 1. For this measurement, 16 different continuous-wave (CW) tones spanning the 300 MHz-40 GHz range are individually applied to the RF input of the link at a power level of 10 dBm. The frequencies of these tones were chosen such that all signals are aliased to 300 MHz at the link output and so that there is one frequency per 2.5 GHz Nyquist bin. The peak signal power at 300 MHz is then measured with an electrical spectrum analyzer. The measured link gain versus frequency is shown in FIG. 5 (circles).

For comparison, the link gain calculated from Eq. (13) using the measured frequency-dependent halfwave voltage of the modulator and an average photocurrent of $I_{avg}$=2.5 mA is shown by the gray curve. In this calculation $P_{sp}(w)^2$ is given by the Fourier transform of the measured intensity autocorrelation [FIG. 2(b)] and the frequency-dependent cable loss at the link input has been included. Across the 40 GHz bandwidth of the measurement the magnitude of the error is below 1 dB and is limited by the system measurement accuracy.

Figure 6:
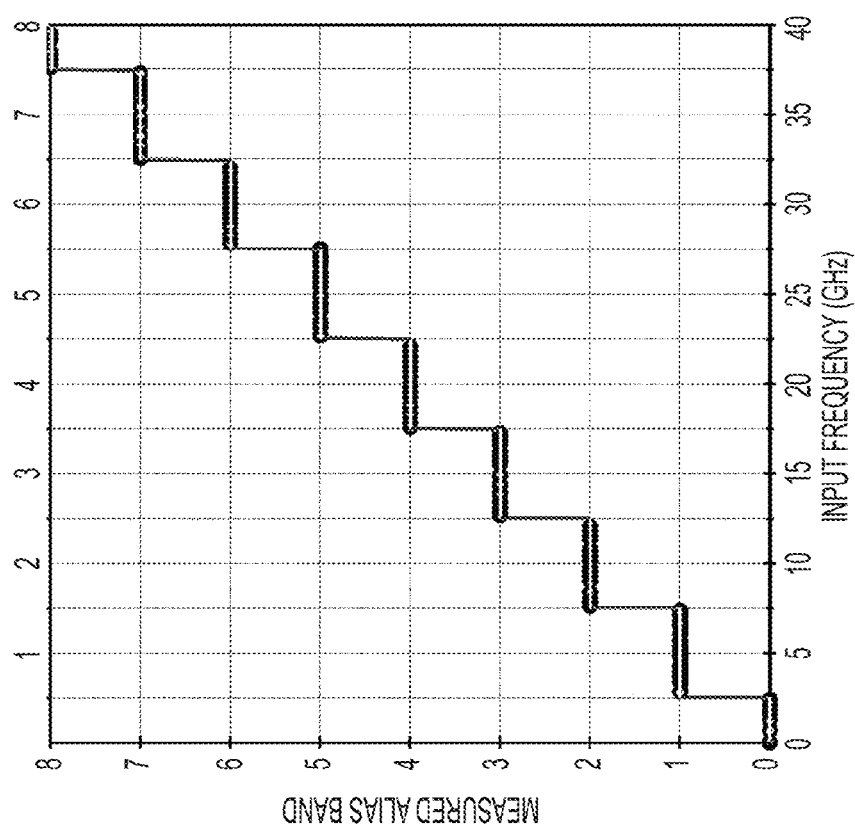
FIG. 6 shows the measured alias band after disambiguation (the top axis shows the input alias band) according to the invention.

In order to show that this technique is truly capable of determining from which alias band an ambiguous signal originated, we perform an automated experiment where the input frequency to the link was randomized. This experiment utilizes a random uniform sample of 1000 different input frequencies within the range of 1 MHz to 40 GHz. The aliased baseband replicas (i.e., those within the fundamental Nyquist band) are measured for each random input and control code determines the SPR normalized to the known SPR at 5 GHz. The corresponding alias band (index n) is then determined from the square root of the normalized SPR. The results of this measurement are shown in FIG. 6; the symbols/line show the measured alias band after disambiguation and the top axis shows the input alias band, for reference. For every input signal the correct alias band was determined across the 40 GHz bandwidth of the measurement proving the technique reliable for coarse broadband RF disambiguation.

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. A system for measuring an RF input signal frequency, comprising:
   a sampling optical pulse train with a frequency-dithered repetition-rate; and
   a sub-sampled analog link coupled to the optical pulse train whereby the RF input signal frequency is determined, wherein the RF input signal frequency is determined by applying thereto the frequency-dithered repetition-rate and then measuring an amplitude of modulation sidebands relative to the RF input signal's aliased signal amplitude, wherein an alias band of the RF input signal is directly determined by measuring a sidelobe-to-peak ratio (SPR) and comparing with that computed from equation $$SPR_{sig} = SPR_{comb} = SPR = \left(\frac{n}{2}\frac{\kappa V_j}{f_j}\right)^2$$

where n is the index of the alias band, k is the FM sensitivity (kHz/V) of a synthesizer driving a comb source, $V_j$ is the amplitude of the FM control voltage, and $\omega_j/2\pi = f_j$ is the FM frequency.

2. A method for measuring an RF signal input frequency, comprising:

optically sampling the RF signal;

applying thereto a frequency-dithered repetition-rate; and measuring an amplitude of modulation sidebands relative to the RF input signal's aliased signal amplitude whereby the RF input signal frequency is determined, wherein the RF input signal frequency is determined by measuring the amplitude of modulation sidebands relative to the RF input signal's aliased signal amplitude, wherein an alias band of the RF input signal is directly determined by measuring a sidelobe-to-peak ratio (SPR) and comparing with that computed from equation $$SPR_{sig} = SPR_{comb} = SPR = \left(\frac{n}{2}\frac{\kappa V_j}{f_j}\right)^2$$

where n is the index of the alias band, k is the FM sensitivity (kHz/V) of a synthesizer driving a comb source, $V_j$ is the amplitude of the FM control voltage, and $\omega_j/2\pi = f_j$ is the FM frequency.

3. The method of claim 2 wherein the optical sampling is conducted via a Mach-Zehnder intensity modulator and the RF signal is recovered by direct detection of the modulated optical pulse train with a photodiode.

4. The method of 2, wherein the optical sampling is performed from a source selected from the group consisting of an optical comb, a tunable-rate actively-modelocked laser, and a mode-locked laser with a known timing jitter.

5. The method of claim 2, wherein the phase-dither is a waveform selected from the group consisting of a simple sinusoidal phase-modulation, a chirped waveform, and a phase-encoded digital waveform.

* * * * *